United States Patent
Lee et al.

(10) Patent No.: US 10,370,545 B2
(45) Date of Patent: Aug. 6, 2019

(54) LOW VOC ANIONIC ELECTRODEPOSITABLE COATING COMPOSITION

(71) Applicant: PPG Industries Ohio, Inc., Cleveland, OH (US)

(72) Inventors: Se Ryeon Lee, Pittsburgh, PA (US); Mark L. Follet, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/708,177

(22) Filed: Sep. 19, 2017

(65) Prior Publication Data

US 2019/0085183 A1   Mar. 21, 2019

(51) Int. Cl.
| | |
|---|---|
| *B32B 27/38* | (2006.01) |
| *C09D 5/00* | (2006.01) |
| *C09D 5/44* | (2006.01) |
| *C09D 163/00* | (2006.01) |
| *C25D 13/04* | (2006.01) |
| *C08G 59/14* | (2006.01) |
| *C09D 7/65* | (2018.01) |
| *B32B 15/092* | (2006.01) |
| *C25D 9/02* | (2006.01) |

(52) U.S. Cl.
CPC ............ *C09D 5/4457* (2013.01); *B32B 27/38* (2013.01); *C08G 59/1422* (2013.01); *C09D 5/4434* (2013.01); *C09D 5/4484* (2013.01); *C09D 7/65* (2018.01); *C09D 163/00* (2013.01); *C25D 13/04* (2013.01); *B32B 15/092* (2013.01); *C25D 9/02* (2013.01)

(58) Field of Classification Search
None
See application file for complete search history.

(56) References Cited

U.S. PATENT DOCUMENTS

| | | | |
|---|---|---|---|
| 4,397,970 A | | 8/1983 | Campbell et al. |
| 4,434,256 A | * | 2/1984 | Dworak ............... C09D 163/00 523/402 |
| 4,605,690 A | * | 8/1986 | Debroy .............. C08G 18/0814 204/501 |
| 4,692,484 A | | 9/1987 | Roberts |
| 4,793,867 A | | 12/1988 | Charles et al. |
| 4,801,628 A | | 1/1989 | Ashing et al. |
| 4,812,215 A | | 3/1989 | Karabin et al. |
| 4,957,952 A | | 9/1990 | Sekmakas et al. |
| 5,389,704 A | | 2/1995 | Yabu |
| 5,492,614 A | * | 2/1996 | Zawacky ............. C09D 5/4484 204/493 |
| 5,588,989 A | | 12/1996 | Vonk et al. |
| 5,635,049 A | | 6/1997 | Mysliwczyk et al. |
| 6,136,927 A | | 10/2000 | Swarup et al. |
| 6,875,800 B2 | | 4/2005 | Vanier et al. |
| 6,894,086 B2 | | 5/2005 | Munro et al. |
| 6,984,674 B2 | | 1/2006 | Gray et al. |
| 7,749,368 B2 | | 7/2010 | McMurdie et al. |
| 8,148,451 B2 | | 4/2012 | Fenn et al. |
| 8,153,344 B2 | | 4/2012 | Faler et al. |
| 8,323,470 B2 | | 12/2012 | Valko et al. |
| 8,354,471 B2 | | 1/2013 | Chouai et al. |
| 8,673,091 B2 | | 3/2014 | McMillen et al. |
| 2003/0034248 A1 | * | 2/2003 | Kaylo ................... C09D 5/025 204/471 |
| 2003/0060541 A1 | | 3/2003 | Kojima et al. |
| 2009/0045071 A1 | | 2/2009 | Valko et al. |
| 2010/0163423 A1 | | 7/2010 | December et al. |
| 2010/0163424 A1 | * | 7/2010 | Chouai ............. C08G 59/1422 205/205 |
| 2010/0166973 A1 | | 7/2010 | December et al. |
| 2013/0065057 A1 | | 3/2013 | Valko et al. |
| 2015/0017447 A1 | * | 1/2015 | Moravek ................ C09D 5/24 428/413 |

FOREIGN PATENT DOCUMENTS

| | | |
|---|---|---|
| WO | 2000039190 A1 | 7/2000 |
| WO | 2007118024 A1 | 10/2007 |

OTHER PUBLICATIONS

Faler et al., U.S. Appl. No. 10/876,031, filed Jun. 24, 2004, for "Aqueous Dispersions of Microparticles Having a Nanoparticulate Phase and Coating Compositions Containing the Same".
Faler et al., U.S. Appl. No. 60/482,167, filed Jun. 24, 2003, for "Aqueous Dispersions of Microparticles Having a Nanoparticulate Phase and Coating Compositions Containing the Same".

* cited by examiner

*Primary Examiner* — Michael J Feely
(74) *Attorney, Agent, or Firm* — Charles M. Yeomans, Esq.

(57) ABSTRACT

The present invention is directed to an electrodepositable coating composition comprising a main vehicle comprising a phosphatized epoxy resin, a plasticizer, and a curing agent, wherein the main vehicle comprises a low-VOC main vehicle. The present invention is also directed to coatings and coated substrates.

22 Claims, No Drawings

LOW VOC ANIONIC ELECTRODEPOSITABLE COATING COMPOSITION

FIELD OF THE INVENTION

The present invention relates to anionic electrodepositable coating compositions having a high-film build and low volatile organic content.

BACKGROUND OF THE INVENTION

Electrodeposition baths are typically supplied as two components: (i) a main vehicle and (ii) a pigment paste. The main vehicle comprises an unpigmented aqueous dispersion which may comprise (a) a main film-forming polymer (e.g., a phosphatized epoxy resin) and (b) additional water-dispersible non-pigmented components. The main vehicle alone may be used as an electrodepositable coating composition if no pigment is desired in the applied coating. However, the electrodepositable coating composition may also comprise both the main vehicle and the pigment paste.

Phosphatized epoxy resins are typically produced in volatile organic solvent. The use of volatile organic solvent is disfavored because of health and environmental considerations. This volatile organic solvent may either be removed by conventional methods, such as vacuum solvent stripping, or will be carried into the dispersions and/or electrodepositable coating compositions that utilize the phosphatized epoxy resin, increasing the amount of volatile organic content present in these compositions.

SUMMARY OF THE INVENTION

An aspect of the invention provides an electrodepositable coating composition comprising a main vehicle comprising: a phosphatized epoxy resin; a plasticizer; and a curing agent; wherein the main vehicle comprises no more than 1.00 lb/gallon of volatile organic content.

The present invention is also directed to coatings and coated substrates.

DETAILED DESCRIPTION OF THE INVENTION

The present invention is directed to an electrodepositable coating composition comprising, consisting essentially of, or consisting of a main vehicle comprising, consisting essentially of, or consisting of a phosphatized epoxy resin, a plasticizer, and a curing agent, wherein the main vehicle comprises a low-VOC main vehicle. The electrodepositable coating composition may optionally include a pigment paste.

As used herein, the term "volatile organic content" or "VOC" refers to organic compounds having a boiling point of less than 250° C. As used herein, the term "boiling point" refers to the boiling point of a substance at standard atmospheric pressure of 101.325 kPa (1.01325 bar or 1 atm). The volatile organic content includes volatile organic solvents. As used herein, the term "volatile organic solvent" refers to organic compounds having a boiling point of less than 250° C., such as less than 200° C. Non-limiting examples of volatile organic solvents may include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Non-limiting examples of other volatile organic solvents include alcohols such as ethanol, isopropanol, butanol and diacetone alcohol.

According to the present invention, the main vehicle comprises a phosphatized epoxy resin. As used herein, the term "phosphatized epoxy resin" refers to an ungelled resin comprising the reaction product of reactants comprising, consisting essentially of, or consisting of an epoxy-functional polymerization product, and a source of phosphoric acid, a source of phosphonic acid, or combinations thereof. By "ungelled" is meant the resins are substantially free of crosslinking and have an intrinsic viscosity when dissolved in a suitable solvent, as determined, for example, in accordance with ASTM-D1795 or ASTM-D4243. The intrinsic viscosity of the reaction product is an indication of its molecular weight. A gelled reaction product, on the other hand, since it is of essentially infinitely high molecular weight due to substantial crosslinking of the resin molecules, will have an intrinsic viscosity too high to measure. As used herein, a reaction product that is "substantially free of crosslinking" refers to a reaction product that has a weight average molecular weight ($M_w$), as determined by gel permeation chromatography, of less than 100,000.

According to the present invention, the epoxy-functional polymerization product comprises a polymerization product prepared by polymerizing reactants comprising, consisting essentially of, or consisting of a polyepoxide, a polyphenol, and a mono-functional acid and/or a mono-functional alcohol to form the epoxy-functional polymerization product. Accordingly, the epoxy-functional polymerization product may comprise, consist essentially of, or consist of the reaction product/residue of a polyepoxide, a polyphenol, and a mono-functional acid and/or a mono-functional alcohol.

The polyepoxide may comprise any compound or mixture of compounds having more than 1.0 epoxy groups per molecule. The polyepoxide may comprise a polyglycidyl ether of a polyphenol, such as a diglycidyl ether of bisphenol A or bisphenol F. As will be appreciated, such polyepoxides can be produced by etherification of a polyphenol with an epichlorohydrin in the presence of an alkali. Suitable polyphenols that may be used to produce the polyepoxide include, without limitation, 1,1-bis(4-hydroxyphenyl)ethane; 2,2-bis(4-hydroxyphenyl)propane; 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and 4,4-bis(4'-hydroxyphenyl)valeric acid. Another useful class of polyepoxides may be produced similarly from polyphenol resins.

The polyepoxide may comprise addition polymerization polymers containing pendant epoxy groups. Such polymers may be made by copolymerizing a variety of polymerizable ethylenically unsaturated monomers at least one of which is an epoxy containing monomer, e.g., glycidyl acrylate or glycidyl methacrylate. Any suitable ethylenically unsaturated monomer that does not contain a group that is reactive with the epoxy group may be employed as a comonomer. Exemplary such monomers include α,β-ethylenically unsaturated monomers, such as unsaturated carboxylic acid esters of saturated alcohols containing from 1 to about 8 carbon atoms, and monovinyl aromatic monomers such as styrene and vinyl toluene.

The polyepoxide may have an epoxy equivalent weight of at least 100 g/epoxy, such as at least 125 g/epoxy, such as at least 150 g/epoxy, and may have an epoxy equivalent weight of no more than 1,000 g/epoxy, such as no more than 500 g/epoxy, such as no more than 200 g/epoxy. The polyepoxide may have an epoxy equivalent weight of 100 g/epoxy to 1,000 g/epoxy, such as 125 g/epoxy to 500 g/epoxy, such as 150 g/epoxy to 200 g/epoxy. As used herein, the term "epoxy equivalent weight" with respect to the polyepoxide refers to the theoretical atomic mass of the polyepoxide molecule divided by the number of epoxide groups present on the molecule. The epoxy equivalent weight may be measured by any method known in the art, such as, for example, ASTM D1652.

Constitutional units comprising the residue of the polyepoxide may be present in the epoxy-functional polymerization product in an amount of at least 60% by weight, such as at least 66% by weight, such as at least 71% by weight, and may be present in an amount of no more than 87% by weight, such as no more than 82% by weight, such as no more than 77% by weight, based on the total weight of the epoxy-functional polymerization product. Constitutional units comprising the residue of the polyepoxide may be present in the epoxy-functional polymerization product in an amount of 60% to 87% by weight, such as 66% to 82% by weight, such as 71% to 77% by weight, based on the total weight of the epoxy-functional polymerization product.

The polyphenol may comprise any compound or mixture of compounds having more than 1.0 phenol groups, i.e. hydroxyl groups directly attached to an aromatic hydrocarbon group, per molecule. The polyphenol may comprise without limitation, bisphenol A (2,2-bis(4-hydroxyphenyl) propane), bisphenol F (bis(4-hydroxyphenyl)methane), bisphenol E (1,1-bis(4-hydroxyphenyl)ethane); 1,1-bis(4-hydroxyphenyl)isobutane; 2,2-bis(4-hydroxytertiarybutylphenyl)propane; bis(2-hydroxynaphthyl)methane; 1,5-dihydroxynaphthalene; 1,1-bis(4-hydroxy-3-allylphenyl)ethane; and 4,4-bis(4'-hydroxyphenyl)valeric acid.

The polyphenol may have a hydroxyl equivalent weight (i.e., phenolic hydroxyl groups) of at least 80 g/hydroxyl, and may be no more than 1,000 g/hydroxyl, such as no more than 500 g/hydroxyl, such as no more than 180 g/hydroxyl. The polyphenol may have a hydroxyl equivalent weight of 80 g/hydroxyl to 1,000 g/hydroxyl, such as 80 g/hydroxyl to 500 g/hydroxyl, such as 80 g/hydroxyl to 180 g/hydroxyl. As used herein, the term "hydroxyl equivalent weight" with respect to the polyphenol refers to the theoretical atomic mass of the polyphenol molecule divided by the number of hydroxyl groups present on the molecule. The hydroxyl equivalent weight may be determined by any method known in the art, such as, for example, ASTM E222.

Constitutional units comprising the residue of the polyphenol may be present in the epoxy-functional polymerization product in an amount of at least 8% by weight, such as at least 13% by weight, such as at least 18% by weight, and may be present in an amount of no more than 32% by weight, such as no more than 27% by weight, such as no more than 23% by weight, based on the total weight of the epoxy-functional polymerization product. Constitutional units comprising the residue of the polyphenol may be present in the epoxy-functional polymerization product in an amount of 8% to 32% by weight, such as 13% to 27% by weight, such as 18% to 23% by weight, based on the total weight of the epoxy-functional polymerization product.

The ratio of epoxide functional groups from the polyepoxide to phenolic hydroxyl groups from the polyphenol may be at least 1.5:1, such as at least 2:1, such as at least 2.3:1, and may be no more than 4:1, such as no more than 3:1, such as no more than 2.5:1. The ratio of epoxide functional groups from the polyepoxide to phenolic hydroxyl groups from the polyphenol may be 1.5:1 to 4:1, such as 2:1 to 3:1, such as 2.3:1 to 2.5:1.

The mono-functional acid may comprise any compound or mixture of compounds having one carboxyl group per molecule. In addition to the carboxyl group, the mono-functional acid may comprise other functional groups that are not chemically reactive with epoxide, hydroxyl or carboxyl functional groups, and, therefore, do not interfere with the polymerization reaction. The mono-functional acid may comprise aromatic mono-acids such as benzoic acid or phenylalkanoic acids such as phenylacetic acid, 3-phenylpropanoic acid, and the like, and aliphatic mono-acids, as well as combinations thereof.

The mono-functional alcohol may comprise any compound or mixture of compounds having one hydroxyl group per molecule. In addition to the hydroxyl group, the mono-functional alcohol may comprise other functional groups that are not chemically reactive with epoxide, hydroxyl or carboxyl functional groups, and, therefore, do not interfere with the polymerization reaction. The mono-functional alcohol may comprise phenol or an alkylphenol such as cresol, xylenol, propylphenol, butylphenol, pentylphenol, hexylphenol, heptylphenol, octylphenol, nonylphenol, decylphenol, undecylphenol, dodecylphenol, long chain alkylphenols comprising an alkyl group having 13 or more carbon atoms, and the like.

The mono-functional alcohol may have a weight average molecular weight of at least 90 g/mol, such as at least 150 g/mol, such as at least 200 g/mol, and may be no more than 500 g/mol, such as no more than 400 g/mol, such as no more than 280 g/mol. The mono-functional alcohol may have a weight average molecular weight of 90 g/mol to 500 g/mol, such as 150 g/mol to 400 g/mol, such as 200 g/mol to 280 g/mol.

Constitutional units comprising the residue of the mono-functional acid and/or mono-functional alcohol may be present in the epoxy-functional polymerization product in an amount of at least 1% by weight, such as at least 2% by weight, such as at least 3% by weight, and may be present in an amount of no more than 14% by weight, such as no more than 11% by weight, such as no more than 9% by weight, based on the total weight of the epoxy-functional polymerization product. Constitutional units comprising the residue of the mono-functional acid and/or mono-functional alcohol may be present in the epoxy-functional polymerization product in an amount of 1% to 14% by weight, such as 2% to 11% by weight, such as 3% to 9% by weight, based on the total weight of the epoxy-functional polymerization product.

The ratio of epoxide functional groups from the polyepoxide to hydroxyl groups from the mono-functional alcohol and/or acid groups from the mono-functional acid may be at least 8:1, such as at least 11:1, such as at least 13:1, and may be no more than 19:1, such as no more than 17:1, such as no more than 15:1. The ratio of epoxide functional groups from the polyepoxide to hydroxyl groups from the mono-functional alcohol and/or acid groups from the mono-functional acid may be 8.1:1 to 19:1, such as 11:1 to 17:1, such as 13:1 to 15:1.

The weight average molecular weight of the epoxy-functional polymerization product may be at least 1,000 g/mol, such as at least 1,800 g/mol, such as at least 2,100 g/mol, and may be no more than 3,500 g/mol, such as no more than 2,700 g/mol, such as no more than 2,300 g/mol. The weight average molecular weight of the epoxy-functional polymerization product may be 1,000 g/mol to 3,500 g/mol, such as 1,800 g/mol to 2,700 g/mol, such as 2,100 g/mol to 2,300 g/mol.

As used herein, unless otherwise stated, the term "weight average molecular weight" means the weight average molecular weight as determined by gel permeation chromatography using a Waters 2695 separation module with a Waters 2414 differential refractometer (RI detector), polystyrene standards having molecular weight of approximately 800 g/mol to 900,000 g/mol, tetrahydrofuran (THF) as the eluent at a flow rate of 1 mL/min, and two PLgel MIXED-C (300×7.5 mm) columns for separation.

The z-average molecular weight of the epoxy-functional polymerization product may be at least 1,000 g/mol, such as at least 2,800 g/mol, such as at least 3,100 g/mol, and may be no more than 6,000 g/mol, such as no more than 4,000 g/mol, such as no more than 3,700 g/mol. The z-average molecular weight of the epoxy-functional polymerization product may be 1,000 g/mol to 6,000 g/mol, such as 2,800 g/mol to 4,000 g/mol, such as 3,100 g/mol to 3,700 g/mol.

As used herein, unless otherwise stated, the term "z-average molecular weight" means the z-average molecular weight as determined by gel permeation chromatography using a Waters 2695 separation module with a Waters 2414 differential refractometer (RI detector), polystyrene standards having molecular weight of approximately 800 g/mol to 900,000 g/mol, tetrahydrofuran (THF) as the eluent at a flow rate of 1 mL/min, and two PLgel MIXED-C (300×7.5 mm) columns for separation.

The theoretical epoxy equivalent weight of the epoxy-functional polymerization product may be at least 250 g/epoxy, such as at least 350 g/epoxy, such as at least 450 g/epoxy, and may be no more than 850 g/epoxy, such as no more than 750 g/epoxy, such as no more than 650 g/epoxy. The epoxy equivalent weight of the epoxy-functional polymerization product may be 250 g/epoxy to 850 g/epoxy, such as 350 g/epoxy to 750 g/epoxy, such as 450 g/epoxy to 650 g/epoxy. As used herein, the term "theoretical epoxy equivalent weight" refers to the theoretical molecular weight of the epoxy-functional polymerization product divided by the theoretical equivalent of epoxy groups present on the polymer.

According to the present invention, the phosphatized epoxy resin comprises the reaction product of reactants comprising, consisting essentially of, or consisting of the epoxy-functional polymerization product and a source of phosphoric acid, a source of phosphonic acid, or combinations thereof. The source of phosphoric acid may comprise phosphoric acid, such as, for example, a 100 percent orthophosphoric acid or a phosphoric acid aqueous solution. The phosphoric acid aqueous solution may comprise 70% to 90% by weight of phosphoric acid in water, such as about 85% by weight phosphoric acid in water. Other forms of phosphoric acid such as superphosphoric acid, diphosphoric acid and triphosphoric acid may be used as the source of phosphoric acid. Also, the polymeric or partial anhydrides of phosphoric acids may be used as the source of phosphoric acid. The source of phosphonic acid may comprise organophosphonic acid. The organophosphonic acid may comprise 3-amino propyl phosphonic acid, 4-methoxyphenyl phosphonic acid, benzylphosphonic acid, butylphosphonic acid, carboxyethylphosphonic acid, diphenylphosphinic acid, dodecylphosphonic acid, ethylidenediphosphonic acid, heptadecylphosphonic acid, methylbenzylphosphinic acid, naphthylmethylphosphinic acid, octadecylphosphonic acid, octylphosphonic acid, pentylphosphonic acid, methylphenylphosphinic acid, phenylphosphonic acid, styrene phosphonic acid, dodecyl bis-1,12-phosphonic acid, poly(ethylene glycol) phosphonic acid.

The ratio of epoxide functional groups from the polyepoxide to P—OH groups from the phosphoric acid or phosphonic acid may be at least 3:1, such as at least 3.25:1, such as at least 3.75:1, and may be no more than 5:1, such as no more than 4.5:1, such as no more than 4.25:1. The ratio of epoxide functional groups from the polyepoxide to P—OH groups from the phosphoric acid or phosphonic acid may be 3:1 to 5:1, such as 3.25:1 to 4.5:1, such as 3.75:1 to 4.25:1.

The ratio of epoxide functional groups from the epoxy-functional polymer to P—OH groups from the phosphoric acid or phosphonic acid may be at least 1:1, such as at least 1.5:1, such as at least 1.9:1, and may be no more than 3:1, such as no more than 2.5:1, such as no more than 2.2:1. The ratio of epoxide functional groups from the epoxy-functional polymer to P—OH groups from the phosphoric acid or phosphonic acid may be 1:1 to 3:1, such as 1.5:1 to 2.5:1, such as 1.9:1 to 2.2:1.

The weight average molecular weight of the phosphatized epoxy resin may be at least 22,000 g/mol, such as at least 28,000 g/mol, such as at least 32,000 g/mol, and may be no more than 40,000 g/mol, such as no more than 38,000 g/mol, such as no more than 37,000 g/mol. The weight average molecular weight of the phosphatized epoxy resin may be 22,000 g/mol to 40,000 g/mol, such as 28,000 g/mol to 38,000 g/mol, such as 32,000 g/mol to 37,000 g/mol. As used herein, the term "weight average molecular weight" with respect to the phosphatized epoxy resin means the weight average molecular weight as determined by gel permeation chromatography using a Waters 2695 separation module with a Waters 410 differential refractometer (RI detector), polystyrene standards having molecular weight of approximately 580 g/mol to 365,000 g/mol, dimethylformamide (DMF) with 0.05 M lithium bromide (LiBr) as the eluent at a flow rate of 0.5 mL/min, and one Shodex Asahipak GF-510HQ (300×7.5 mm, 5 μm) column for separation.

According to the present invention, the polymerization of the epoxy-functional polymer and subsequent reaction of the epoxy-functional polymer with the source of phosphoric acid or a source of phosphonic acid to form the phosphatized epoxy resin may be performed in a solvent system comprising a plasticizer and, optionally, volatile organic solvent. It should be understood that any water, which may be present in the reaction mixture, is not considered a part of the solvent system. As used herein, the term "plasticizer" refers to an organic compound that may be liquid at ambient conditions and may have a boiling point of at least 250° C. The solvent system may serve to solubilize the reactants of the polymerization reaction(s). The solvent system may also participate as a reactant in the preparation of the phosphatized epoxy resin such that the phosphatized epoxy resin may comprise, consist of, or consist essentially of the residue of the epoxy-functional polymer, the residue of the source of phosphoric acid or source of phosphonic acid, and, optionally, the residue of the plasticizer and/or volatile organic solvent.

The plasticizer may comprise any organic compound having a boiling point of at least 250° C. and may be in a liquid state at ambient temperature and pressure, such as, e.g., 25° C. For example, the plasticizer may comprise a mono-functional organic alcohol or mono-functional organic acid having a boiling point of at least 250° C. The term "mono-functional" with respect to the plasticizer refers to the presence of a functional group that is reactive with acid groups, hydroxyl groups, or epoxy groups, and does not exclude the presence of other non-reactive functional groups, such as, for example, ester or ether groups. The plasticizer may comprise polyethylene glycol ester, polypropylene glycol ester, or combinations thereof. The plasticizer may solubilize the epoxy-functional polymerization product and the source of phosphoric acid or the source of phosphonic acid. Non-limiting examples of commercially available plasticizers include, for example, polyethylene glycol esters, such as PEG400 monolaurate (poly(ethylene glycol) monolaurate) available from Hallstar, butyl carbitol formal (available as MAZON 1651 from BASF), and alcohol ethoxylates, such as $C_{10}$-Guerbet alcohol ethoxylates (e.g. Lutensol XP50 available from BASF).

The plasticizer may have a number average molecular weight of at least 200 g/mol, such as at least 300 g/mol, such as at least 400 g/mol, such as at least 600 g/mol, and may be no more than 1,500 g/mol, such as no more than 1,300 g/mol, such as no more than 1,100 g/mol, such as no more than 1,000. The plasticizer may have a number average molecular weight of 200 g/mol to 1,500 g/mol, such as 300 g/mol to 1,300 g/mol, such as 400 g/mol to 1,100 g/mol, such as 600 g/mol to 1,000. As used herein, the term "number average molecular weight" with respect to the plasticizer means the number average molecular weight as determined by gel permeation chromatography using a Waters 2695 separation module with a Waters 2414 differential refractometer (RI detector), polystyrene standards having molecular weight approximately of 162 g/mol to 30,000 g/mol, tetrahydrofuran (THF) as the eluent at a flow rate of 1 mL/min, and three Styragel High Resolution (HR2/HR1/HR0.5, 300×7.5 mm) columns were used for separation.

The plasticizer may be present in the solvent system in any amount, based on the total weight of the solvent system. For example, the plasticizer may be present in the solvent system in an amount of at least 50% by weight, such as at least 60% by weight, such as at least 70% by weight, such as at least 80% by weight, such as at least 99.9% by weight, such as 100% by weight, and may be present in an amount of no more than 99.9% by weight, such as no more than 90% by weight, such as no more than 85% by weight, based on the total weight of the solvent system. The plasticizer may be present in the solvent system in an amount of 50% by weight to 100% by weight, such as 60% by weight to 90% by weight, such as 70% by weight to 85% by weight, based on the total weight of the solvent system.

The volatile organic solvent may comprise any conventional organic solvent having a boiling point of less than 250° C., such as less than 200° C.

The volatile organic solvent, when present, may be present in the solvent system in an amount of at least 0.1% by weight, such as at least 10% by weight, such as at least 15% by weight, and may be present in an amount of no more than 50% by weight, such as no more than 40% by weight, such as no more than 30% by weight, based on the total weight of the solvent system. The volatile organic solvent may be present in the solvent system in an amount of 0% by weight to 50% by weight, such as 10% by weight to 40% by weight, such as 15% by weight to 30% by weight, based on the total weight of the solvent system.

It has been surprisingly discovered that the use of the plasticizer in the solvent system allows for the production of a phosphatized epoxy resin with the use of less volatile organic content, such as volatile organic solvent, than previous methods. For example, according to the present invention, the weight ratio of phosphatized epoxy resin solids to volatile organic content may be at least 7:1, such as at least 10:1, such as at least 14:1, and may be no more than 25:1, such as no more than 19:1, such as no more than 16:1. The weight ratio of phosphatized epoxy resin solids to volatile organic content may be 7:1 to 25:1, such as 10:1 to 19:1, such as 14:1 to 16:1. As used herein, the "phosphatized epoxy resin solids" includes the phosphatized epoxy resin and plasticizer. The volatile organic content includes all of the volatile organic solvent included regardless of whether it is incorporated into the phosphatized epoxy resin during preparation.

According to the present invention, the phosphatized epoxy resin may be dispersed in a dispersing medium comprising water. The phosphatized epoxy resin may be, prior to or during dispersion in a dispersing medium comprising water, at least partially neutralized by, for example, treating with a base to form a water-dispersible anionic salt group-containing phosphatized epoxy resin. As used herein, the term "water-dispersible" means that a material is adapted to be solubilized, dispersed, and/or emulsified in water. As used herein, the term "anionic salt group-containing phosphatized epoxy resin" refers to a phosphatized epoxy resin comprising at least partially neutralized anionic functional groups, such as, for example, phosphoric acid groups, that impart a negative charge to the resin. Non-limiting examples of suitable bases include both organic and inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholines, e.g., N-methylmorpholine or N-ethylmorpholine. The percent of neutralization is such as would make the resin water-dispersible and electrophoretic. One or more of such bases may be added to the phosphatized epoxy resin in an amount sufficient to theoretically neutralize the phosphatized epoxy resin from, for example, 20 to 200 percent, such as 40 to 150 percent, such as 60 to 120 percent of theoretical neutralization.

As a result, the present invention is also directed to aqueous resinous dispersions of the phosphatized epoxy resin of the present invention. The aqueous dispersion of the phosphatized epoxy resin may be formed by diluting the phosphatized epoxy resin and solvent system described above in water, and may be referred to as a phosphatized epoxy resin dispersion.

It has also been surprisingly discovered that the use of the epoxy-functional polymerization product described above and the plasticizer in the solvent system during the preparation of the phosphatized epoxy resin allows for the preparation of a phosphatized epoxy resin and phosphatized epoxy resin dispersion having a lower VOC than previous phosphatized epoxy resins and phosphatized epoxy resin dispersions. The low-VOC of the phosphatized epoxy resin dispersion may be achieved without the need for removal of volatile organic compounds by conventional methods, such as, for example, solvent stripping by vacuum distillation or other art recognized techniques.

The phosphatized epoxy resin or phosphatized epoxy resin dispersion may be blended with other components of the electrodepositable coating composition to form the main vehicle of the electrodepositable coating composition. For example, prior to or after dispersing the phosphatized epoxy resin in water, a curing agent and/or other water-dispersible, non-pigmented components (as further defined below) may be blended with the phosphatized epoxy resin or phosphatized epoxy resin dispersion. Accordingly, the low-VOC of the phosphatized epoxy resin also allows for the production of a low-VOC main vehicle. The main vehicle or main vehicle dispersion comprising, consisting essentially of, or consisting of the phosphatized epoxy resin, plasticizer, curing agent, and, optionally, water may have less than 1.00 lb/gal of VOC, such as less than 0.75 lb/gal of VOC, such as less than 0.55 lb/gal of VOC, such as less than 0.50 lb/gal of VOC. As used herein, the VOC concentration is calculated according to the following formula:

$$VOC \text{ (lb/gallon)} = \frac{\text{weight of } VOC \text{ solvent (lb)}}{\text{volume of total resin dispersion (gal)} - \text{volume of water(gal)}}$$

Likewise, the low-VOC phosphatized epoxy resin and dispersions of the present invention allow for the production of anionic electrodepositable coating compositions having a lower VOC content than previous anionic electrodepositable coating compositions. For example, a low-VOC electrodepositable coating composition may comprise, consist essentially of, or consist of the main vehicle comprising, consisting essentially of, or consisting of the phosphatized epoxy resin, the plasticizer and curing agent, without a pigment. In the case of electrodepositable coating compositions without pigment, the electrodepositable coating composition may have the same upper limits of VOC as the low-VOC main vehicle.

Additionally, the low-VOC phosphatized epoxy resin and dispersions of the present invention allow for the production of pigmented anionic electrodepositable coating compositions having a lower VOC content than previous pigmented anionic electrodepositable coating compositions. The VOC of the pigmented anionic electrodepositable coating composition may vary depending upon the type of pigment composition used. Accordingly, the low-VOC of the phosphatized epoxy resin also allows for the production of a pigmented anionic electrodepositable coating composition having a lower VOC content than previously available. The pigmented anionic electrodepositable coating composition may have less than 2.00 lb/gal of VOC, such as less than 1.50 lb/gal of VOC, such as less than 1.30 lb/gal of VOC, such as less than 1.20 lb/gal of VOC, such as less than 1.00 lb/gal of VOC, such as less than 0.75 lb/gal of VOC, such as less than 0.50 lb/gal of VOC.

The phosphatized epoxy resin may be present in the electrodepositable coating composition in an amount of at least 40% by weight, such as at least 45% by weight, such as at least 50% by weight, and may be present in an amount of no more than 80% by weight, such as no more than 70% by weight, such as no more than 60% by weight, based on the total weight of the resin solids of the electrodepositable coating composition. The phosphatized epoxy resin may be present in the electrodepositable coating composition in an amount of 40% by weight to 80% by weight, such as 45% by weight to 70% by weight, such as 50% by weight to 60% by weight, based on the total weight of the resin solids of the electrodepositable coating composition. As used herein, the "resin solids" of the electrodepositable coating includes the phosphatized epoxy resin, the plasticizer, the curing agent, and any additional water-dispersible non-pigmented component(s) present in the electrodepositable coating composition. The resin solids do not include pigmented components.

The plasticizer may be present in the electrodepositable coating composition in an amount of at least 10% by weight, such as at least 14% by weight, such as at least 18% by weight, and may be present in an amount of no more than 40% by weight, such as no more than 30% by weight, such as no more than 25% by weight, based on the total weight of the resin solids of the electrodepositable coating composition. The plasticizer may be present in the electrodepositable coating composition in an amount of 10% by weight to 40% by weight, such as 14% by weight to 30% by weight, such as 18% by weight to 25% by weight, based on the total weight of the resin solids of the electrodepositable coating composition.

According to the present invention, as discussed above, the electrodepositable coating composition of the present invention may further comprise a curing agent. The curing agent may be pre-blended with the phosphatized epoxy resin to form a main vehicle for use in an electrodepositable coating composition. The curing agent may react with the reactive groups, such as active hydrogen groups, of the phosphatized epoxy resin to effectuate cure of the coating composition to form a coating. Non-limiting examples of suitable curing agents are aminoplast resins and phenoplast resins.

Aminoplast resins are condensation products of an aldehyde with an amino- or amido-group carrying substance. Condensation products obtained from the reaction of alcohols and an aldehyde with melamine, urea or benzoguanamine may be used. However, condensation products of other amines and amides may also be employed, for example, aldehyde condensates of triazines, diazines, triazoles, guanidines, guanamines and alkyl- and aryl-substituted derivatives of such compounds, including alkyl- and aryl-substituted ureas and alkyl- and aryl-substituted melamines. Some examples of such compounds are N,N'-dimethyl urea, benzourea, dicyandiamide, formaguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 3,4,6-tris(ethylamino)-1,3,5-triazine, and the like. Suitable aldehydes include formaldehyde, acetaldehyde, crotonaldehyde, acrolein, benzaldehyde, furfural, glyoxal and the like.

The aminoplast resins may contain methylol or similar alkylol groups, and at least a portion of these alkylol groups may be etherified by a reaction with an alcohol. Any monohydric alcohol may be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as 2-ethoxyethanol (and other Cellosolves), and halogen-substituted or other substituted alcohols, such as 3-chloropropanol and butoxyethanol.

Non-limiting examples of commercially available aminoplast resins are those available under the trademark CYMEL® from Allnex Belgium SA/NV, such as CYMEL 1130 and 1156, and RESIMENE® from INEOS Melamines, such as RESIMENE 750 and 753.

Phenoplast resins are formed by the condensation of an aldehyde and a phenol. Suitable aldehydes include formaldehyde and acetaldehyde. Methylene-releasing and aldehyde-releasing agents, such as paraformaldehyde and hexamethylene tetramine, may also be utilized as the aldehyde agent. Various phenols may be used, such as phenol itself, a cresol, or a substituted phenol in which a hydrocarbon radical having either a straight chain, a branched chain or a cyclic structure is substituted for a hydrogen in the aromatic ring. Mixtures of phenols may also be employed. Some specific examples of suitable phenols are p-phenylphenol, p-tert-butylphenol, p-tert-amylphenol, cyclopentylphenol and unsaturated hydrocarbon-substituted phenols, such as the monobutenyl phenols containing a butenyl group in ortho, meta or para position, and where the double bond occurs in various positions in the hydrocarbon chain.

Aminoplast and phenoplast resins, as described above, are described in U.S. Pat. No. 4,812,215 at col. 6, line 20 to col. 7, line 12, the cited portion of which being incorporated herein by reference.

The curing agent may be present in the electrodepositable coating composition in an amount of at least 10% by weight, such as at least 20% by weight, such as at least 25% by weight, and may be present in an amount of no more than 50% by weight, such as no more than 45% by weight, such as no more than 40% by weight, based on the total weight of the resin solids of the electrodepositable coating composition. The curing agent may be present in the anionic electrodepositable coating composition in an amount of 10% to 50% by weight, such as 20% to 45% by weight, such as 25% to 40% by weight, based on the total weight of the resin solids of the electrodepositable coating composition.

According to the present invention, the electrodepositable coating composition may optionally comprise a pigment paste. As used herein, the term "pigment paste" refers to a dispersion comprising pigment. The pigment paste may comprise pigments including, for example, iron oxides, lead oxides, strontium chromate, carbon black, coal dust, titanium dioxide, talc, barium sulfate, as well as color pigments such as cadmium yellow, cadmium red, chromium yellow and the like. The pigment content of the electrodepositable coating composition may be expressed as the pigment-to-resin weight ratio, and may be within the range of, for example, 0.03 to 0.6, when pigment is used. It will be understood by one skilled in the art that the VOC of the pigment paste varies depending upon a number of factors, including, for example, the desired color. For example, white pigment pastes typically have more VOC than other pigment pastes. Additionally, pigment pastes may have VOC removed by typical methods known in the art, such as vacuum distillation, prior to being blended into a coating composition. Accordingly, the use of the phosphatized epoxy resin of the present invention will allow for the production of an electrodepositable coating composition having a lower VOC than a comparable coating composition that includes the same pigment paste and a different main vehicle phosphatized epoxy resin.

The electrodepositable coating composition according to the present invention may optionally comprise one or more further components in addition to the phosphatized epoxy resin, plasticizer, and the curing agent described above.

According to the present invention, the electrodepositable coating composition may optionally comprise a catalyst to catalyze the reaction between the reactive components of the coating composition. Examples of suitable catalysts include latent acid catalysts, specific examples of which are identified in WO 2007/118024 at [0031] and include, but are not limited to, ammonium hexafluoroantimonate, quaternary salts of $SbF_6$ (e.g., NACURE® XC-7231), t-amine salts of $SbF_6$ (e.g., NACURE® XC-9223), Zn salts of triflic acid (e.g., NACURE® A202 and A218), quaternary salts of triflic acid (e.g., NACURE® XC-A230), and diethylamine salts of triflic acid (e.g., NACURE® A233), all commercially available from King Industries, and/or mixtures thereof. Latent acid catalysts may be formed by preparing a derivative of an acid catalyst such as para-toluenesulfonic acid (pTSA) or other sulfonic acids. For example, a well-known group of blocked acid catalysts are amine salts of aromatic sulfonic acids, such as pyridinium para-toluenesulfonate. Such sulfonate salts are less active than the free acid in promoting crosslinking. During cure, the catalysts may be activated by heating.

According to the present invention, the electrodepositable coating composition may comprise other optional ingredients, such as various additives such as fillers, anti-oxidants, biocides, UV light absorbers and stabilizers, hindered amine light stabilizers, defoamers, fungicides, dispersing aids, flow control agents, surfactants, wetting agents, or combinations thereof. Alternatively, the electrodepositable coating composition may be completely free of any of the optional ingredients, i.e., the optional ingredient is not present in the electrodepositable coating composition. The additives mentioned above may each be present in the electrodepositable coating composition in amounts of 0.01% to 3% by weight, based on total weight of the resin solids of the electrodepositable coating composition.

According to the present invention, the total solids content of the electrodepositable coating composition may be at least 1% by weight, such as at least 5% by weight, and may be no more than 50% by weight, such as no more than 40% by weight, such as no more than 20% by weight, based on the total weight of the electrodepositable coating composition. The total solids content of the electrodepositable coating composition may be from 1% to 50% by weight, such as 5% to 40% by weight, such as 5% to 20% by weight, based on the total weight of the electrodepositable coating composition. As used herein, "total solids" refers to the non-volatile content of the electrodepositable coating composition, i.e., materials which will not volatilize when heated to 110° C. for 60 minutes.

According to the present invention, the anionic electrodepositable coating composition of the present invention may be deposited upon an electrically conductive substrate by placing the composition in contact with an electrically conductive cathode and an electrically conductive anode, with the surface to be coated being the anode. Following contact with the composition, an adherent film of the coating composition is deposited on the anode when a sufficient voltage is impressed between the electrodes. The conditions under which the electrodeposition is carried out are, in general, similar to those used in electrodeposition of other types of coatings. The applied voltage may be varied and can be, for example, as low as one volt to as high as several thousand volts, such as between 50 and 500 volts. The current density may be between 0.5 ampere and 15 amperes per square foot and tends to decrease during electrodeposition indicating the formation of an insulating film.

Once the anionic electrodepositable coating composition is electrodeposited over at least a portion of the electroconductive substrate, the coated substrate may be heated to a temperature and for a time sufficient to cure the electrodeposited coating on the substrate. The coated substrate may be heated to a temperature ranging from 200° F. to 450° F. (93° C. to 232.2° C.), such as from 275° F. to 400° F. (135° C. to 204.4° C.), such as from 300° F. to 360° F. (149° C. to 180° C.). The curing time may be dependent upon the curing temperature as well as other variables, for example, film thickness of the electrodeposited coating, level and type of catalyst present in the composition and the like. For purposes of the present invention, all that is necessary is that the time be sufficient to effect cure of the coating on the substrate. For example, the curing time may range from 10 to 60 minutes, such as 20 to 40 minutes.

As used herein, the term "cure", "cured" or similar terms, as used in connection with the electrodepositable coating composition described herein, means that at least a portion of the components that form the electrodepositable coating composition are crosslinked to form a coating. Additionally, curing of the coating composition refers to subjecting said composition to curing conditions, such as those described above, leading to the reaction of the reactive functional groups of the components of the electrodepositable coating composition, and resulting in the crosslinking of the components of the composition and formation of a cured coating. The electrodepositable coating composition may be subjected to curing conditions until it is at least partially cured. As used herein, the term "at least partially cured" means subjecting the coating composition to curing conditions to form a coating, wherein reaction of at least a portion of the reactive groups of the components of the coating composition occurs. The coating composition may also be subjected to curing conditions such that a substantially complete cure is attained and wherein further curing results in no significant further improvement in the coating properties.

It has been surprisingly discovered that use of the phosphatized epoxy resin of the present invention in an electrodepositable coating composition allows for the electrodeposition of thicker coatings than previous anionic electrodepositable coating compositions. In fact, very thick coatings having a dry film thickness of 250 microns (10 mil) or more may be achieved with the electrodepositable coating composition of the present invention. For example, the electrodeposited coating may have a dry film thickness of 15 to 381 microns (1 to 15 mil) or more, such as at least 15 microns, such as at least 25 microns, such as at least 38.1 microns, such as at least 50 microns, such as at least 100 microns, such as at least 200 microns, such as at least 250 microns, such as at least 300 microns. This was a surprising and unexpected result.

It has also been surprisingly discovered that the electrodepositable coating composition of the present invention may result in a coating having superior UV durability as demonstrated by a high gloss retention. For example, a coating resulting from the electrodepositable coating composition of the present invention may have a gloss retention of at least 60%, such as at least 80%, such as at least 95%, such as at least 100%. The gloss retention was measured according to the UV Durability Test as follows: An initial 60° gloss of each cured panel was measured using a BYK-Gardner gloss meter, and the panels were then exposed to the sun in Florida (Fort Lauderdale) at a 45° angle from horizontal facing south for 3 months. Following the exposure, the 60° gloss of each panel was measured in the same way. The gloss retention was calculated by dividing the 60° gloss value after exposure by the initial 60° gloss value and multiplying by 100%.

According to the present invention, the electrodepositable coating composition may be electrophoretically applied to a substrate. The electrodepositable coating composition may be electrophoretically deposited upon any electrically conductive substrate. Suitable substrates include metal substrates, metal alloy substrates, and/or substrates that have been metallized, such as nickel plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. The substrate may comprise a casted metal or metal alloy, such as cast iron. Aluminum alloys of the 2XXX, 5XXX, 6XXX, or 7XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. The substrate may have a rough surface profile or smooth surface profile. For example, the substrate may comprise a cast iron substrate having a comparatively rougher surface due to the presence of refractory materials used in the mold during the casting process. Suitable metal substrates for use in the present invention include those that are often used in the assembly of vehicular bodies (e.g., without limitation, door, body panel, trunk deck lid, roof panel, hood, roof and/or stringers, rivets, landing gear components, and/or skins used on an aircraft), a vehicular frame, vehicular parts, motorcycles, wheels, industrial structures and components such as appliances, including washers, dryers, refrigerators, stoves, dishwashers, and the like, agricultural equipment, lawn and garden equipment, air conditioning units, heat pump units, lawn furniture, and other articles. As used herein, "vehicle" or variations thereof includes, but is not limited to, civilian, commercial and military aircraft, and/or land vehicles such as cars, motorcycles, and/or trucks. The metal substrate also may be in the form of, for example, a sheet of metal or a fabricated part. The metal substrate may in the shape of a cylinder, such as a pipe, including, for example, a cast iron pipe. It will also be understood that the substrate may be pretreated with a pretreatment solution including a zinc phosphate pretreatment solution such as, for example, those described in U.S. Pat. Nos. 4,793,867 and 5,588,989, or a zirconium containing pretreatment solution such as, for example, those described in U.S. Pat. Nos. 7,749,368 and 8,673,091.

The present invention is also directed to methods for coating an electroconductive substrate. According to the present invention, the method may comprise (a) electrophoretically depositing on the substrate an electrodepositable coating composition of the present invention and (b) heating the coated substrate to a temperature and for a time sufficient to cure the electrodeposited coating on the substrate. According to the present invention, the method may comprise (a) electrophoretically depositing on the substrate an electrodepositable coating composition of the present invention to form an electrodeposited coating over at least a portion of the substrate, (b) heating the coated substrate to a temperature and for a time sufficient to cure the electrodeposited coating on the substrate, (c) applying directly to the cured electrodeposited coating one or more pigment-containing coating compositions and/or one or more pigment-free coating compositions to form a top coat over at least a portion of the cured electrodeposited coating, and (d) heating the coated substrate of step (c) to a temperature and for a time sufficient to cure the top coat.

The electrodepositable coating compositions of the present invention may also, if desired, be applied to a substrate using non-electrophoretic coating application techniques, such as flow, dip, spray and roll coating applications. For non-electrophoretic coating applications, the coating compositions may be applied to conductive substrates as well as non-conductive substrates such as glass, wood and plastic.

The present invention is further directed to an at least partially cured coating formed by at least partially curing the electrodepositable coating composition described herein.

The present invention is further directed to a substrate that is at least partially coated with the electrodepositable coating composition described herein in an at least partially cured state.

The electrodepositable coating compositions of the present invention may be utilized in an electrocoating layer that is part of a multi-layer coating composite comprising a substrate with various coating layers. The coating layers may optionally include a pretreatment layer, such as a phosphate layer (e.g., zinc phosphate layer) or metal oxide layer (e.g., zirconium oxide layer), an electrocoating layer which results from the electrodepositable coating composition of the present invention, optionally one or more primer layer(s) and suitable top coat layer(s) (e.g., base coat, clear coat layer, pigmented monocoat, and color-plus-clear composite compositions). It is understood that suitable topcoat layers include any of those known in the art, and each independently may be waterborne, solventborne, in solid particulate form (i.e., a powder coating composition), or in the form of a powder slurry. The top coat typically includes a film-forming polymer, crosslinking material and, if a colored base coat or monocoat, one or more pigments. According to the present invention, the primer layer is disposed between the electrocoating layer and the base coat layer. According to the present invention, one or more of the topcoat layers are applied onto a substantially uncured underlying layer. For example, a clear coat layer may be applied onto at least a portion of a substantially uncured basecoat layer (wet-on-wet), and both layers may be simultaneously cured in a downstream process.

Moreover, the top coat layers may be applied directly onto the electrodepositable coating layer. In other words, the substrate may lack a primer layer. For example, a basecoat layer may be applied directly onto at least a portion of the electrodepositable coating layer.

It will also be understood that the top coat layers may be applied onto an underlying layer despite the fact that the underlying layer has not been fully cured. For example, a clearcoat layer may be applied onto a basecoat layer even though the basecoat layer has not been subjected to a curing step. Both layers may then be cured during a subsequent curing step thereby eliminating the need to cure the basecoat layer and the clearcoat layer separately.

According to the present invention, additional ingredients such as colorants and fillers may be present in the various coating compositions from which the top coat layers result. Any suitable colorants and fillers may be used. For example, the colorant may be added to the coating in any suitable form, such as discrete particles, dispersions, solutions and/or flakes. A single colorant or a mixture of two or more colorants can be used in the coatings of the present invention. It should be noted that, in general, the colorant can be present in a layer of the multi-layer composite in any amount sufficient to impart the desired property, visual and/or color effect.

Example colorants include pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant may be organic or inorganic and may be agglomerated or non-agglomerated. Colorants may be incorporated into the coatings by grinding or simple mixing. Colorants may be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPP red BO"), titanium dioxide, carbon black, zinc oxide, antimony oxide, etc. and organic or inorganic UV opacifying pigments such as iron oxide, transparent red or yellow iron oxide, phthalocyanine blue and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene, aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemical, Inc.

The colorant may be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions may include colorants such as pigments or dyes having a particle size of less than 150 nm, such as less than 70 nm, or less than 30 nm. Nanoparticles may be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions may also be produced by crystallization, precipitation, gas phase condensation, and chemical attrition (i.e., partial dissolution). In order to minimize re-agglomeration of nanoparticles within the coating, a dispersion of resin-coated nanoparticles may be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are identified in U.S. application Ser. No. 10/876,031 filed Jun. 24, 2004, which is incorporated herein by reference, and U.S. Provisional Application No. 60/482,167 filed Jun. 24, 2003, which is also incorporated herein by reference.

According to the present invention, special effect compositions that may be used in one or more layers of the multi-layer coating composite include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions may provide other perceptible properties, such as reflectivity, opacity or texture. For example, special effect compositions may produce a color shift, such that the color of the coating changes when the coating is viewed at different angles. Example color effect compositions are identified in U.S. Pat. No. 6,894,086, incorporated herein by reference. Additional color effect compositions may include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

According to the present invention, a photosensitive composition and/or photochromic composition, which reversibly alters its color when exposed to one or more light sources, can be used in a number of layers in the multi-layer composite. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition may be colorless in a non-excited state and exhibit a color in an excited state. Full color-change may appear within milliseconds to several minutes, such as from 20 seconds to 60 seconds. Example photochromic and/or photosensitive compositions include photochromic dyes.

The photosensitive composition and/or photochromic composition may be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. application Ser. No. 10/892,919 filed Jul. 16, 2004 and incorporated herein by reference.

For purposes of this detailed description, it is to be understood that the invention may assume alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, "including," "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

In this application, the use of the singular includes the plural and plural encompasses singular, unless specifically stated otherwise. For example, although reference is made herein to "a" phosphatized epoxy resin, "an" epoxy-functional polymerization product, "a" source of phosphoric acid, "a" source of phosphonic acid, "a" polyepoxide, "a" polyphenol, "a" mono-functional alcohol, "a" mono-functional acid, and "a" plasticizer, a combination (i.e., a plurality) of these components may be used. In addition, in this application, the use of "or" means "and/or" unless specifically stated otherwise, even though "and/or" may be explicitly used in certain instances.

Whereas specific aspects of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

ASPECTS

1. An electrodepositable coating composition comprising a main vehicle comprising:
    a phosphatized epoxy resin;
    a plasticizer; and
    a curing agent;
    wherein the main vehicle comprises no more than 1.00 lb/gallon of volatile organic content.

2. The electrodepositable coating composition of Aspect 1, wherein the phosphatized epoxy resin comprises a reaction product of reactants comprising:
    an epoxy-functional polymerization product; and
    a source of phosphoric acid, a source of phosphonic acid, or combinations thereof.

3. The electrodepositable coating compositions of Aspect 2, wherein the reaction for forming the reaction product is performed in a solvent system comprising the plasticizer, and the solvent system comprises no more than 50% by weight of volatile organic solvent, based on the total weight of the solvent system.

4. The electrodepositable coating composition of Aspect 2 or 3, wherein the epoxy-functional polymerization product comprises the product of reacting:
    a polyepoxide;
    a polyphenol; and
    a mono-functional acid and/or a mono-functional alcohol.

5. The electrodepositable coating composition of Aspect 4, wherein the mono-functional acid comprises benzoic acid and/or the mono-functional alcohol comprises an optionally substituted phenol, wherein said optionally substituted phenol comprises nonyl phenol, dodecyl phenol or combinations thereof.

6. The electrodepositable coating composition of any of the preceding Aspects, wherein the phosphatized epoxy resin has a molecular weight of 22,000 g/mol to 40,000 g/mol, as measured by gel permeation chromatography using polystyrene standards.

7. The electrodepositable coating composition of any of the preceding Aspects, wherein the plasticizer comprises a polyethylene glycol ester and/or a polypropylene glycol ester, wherein the polyethylene glycol ester comprises polyethylene glycol monolaurate and/or the polyethylene glycol ester has a molecular weight of 200 g/mol to 1,500 g/mol, as measured by gel permeation chromatography using polystyrene standards.

8. The electrodepositable coating composition of any of the preceding Aspects, wherein the plasticizer has a boiling point of greater than 250° C.

9. The electrodepositable coating composition of any of the preceding Aspects, wherein the ratio of phosphatized epoxy resin solids to volatile organic content is 7:1 to 25:1.

10. The electrodepositable coating composition of any of the preceding Aspects, wherein the coating composition comprises 10% to 40% by weight of the plasticizer, based on the total weight of the resin solids.

11. The electrodepositable coating composition of any of the preceding Aspects, wherein a coating applied by electrodepositing the coating composition has a dry film thickness of at least 38.1 microns, such as at least 50 microns.

12. The electrodepositable coating composition of any of the preceding Aspects further comprising a pigment paste.

13. The electrodepositable coating composition of any of the preceding Aspects, wherein a coating applied by electrodepositing the coating composition has a gloss retention of at least 60% after 3 months UV exposure as measured according to the UV Durability Test.

14. A coating formed by at least partially curing the electrodepositable coating composition of any of the preceding Aspects.

15. A substrate coated with the electrodepositable coating composition of any of the Aspects 1-13 in an at least partially cured state.

Illustrating the invention are the following examples, which, however, are not to be considered as limiting the invention to their details. Unless otherwise indicated, all parts and percentages in the following examples, as well as throughout the specification, are by weight.

EXAMPLES

Phosphatized Epoxy Resin Examples

Example A

Preparation of an Anionic Phosphatized Epoxy Resin Dispersion Prepared using Nonyl Phenol

| Charge # | Material | Amount (g) |
|---|---|---|
| 1 | Epon 880[1] | 662.7 |
| 2 | Bisphenol A | 182.4 |
| 3 | Nonyl phenol[2] | 62.2 |
| 4 | Butyl cellosolve | 80.0 |
| 5 | PEG400 monolaurate[3] | 120.0 |

-continued

| Charge # | Material | Amount (g) |
|---|---|---|
| 6 | Ethyl triphenyl phosphonium bromide | 0.6 |
| 7 | PEG400 monolaurate[3] | 80.0 |
| 8 | Phosphoric acid (85%)[4] | 37.1 |
| 9 | Deionized water | 57.9 |
| 10 | Diisopropanolamine | 77.1 |
| 11 | CYMEL 1130 (98.10% solids in butanol)[5] | 379.4 |
| 12 | MAZON 1651[6] | 123.6 |

[1] A diglycidyl ether of bisphenol A available from Hexion
[2] Available from, for example, BASF
[3] Available as PEG 400 ML from Hallstar
[4] Available from Akzo Nobel Chemicals
[5] Methylated/butylated melamine formaldehyde resin curing agent, available from Allnex
[6] Butylcarbitol formal available from BASF Corporation To a 4-neck 3-liter round-bottom flask fitted with a reflux condenser and a mechanical stirrer, charges 1 through 6 were added and heated to 160° C. The mixture was allowed to exotherm (maximum of 180° C.) and was held for 1 hour at 160° C. The mixture was allowed to cool to about 90° C. and charge 7 was then added. At 90° C., charge 8 was added and the mixture was allowed to exotherm to about 135° C. The mixture was subsequently maintained at a temperature of 120° C. for 30 min and then allowed to cool to 100° C. At 100° C., charge 9 was added over 10 minutes and a temperature of about 100° C. was maintained for 2 hours. The mixture was then allowed to cool to 90° C. and charge 10 was added, followed by charge 11 and charge 12. After mixing for 30 minutes, 1,676.7 grams of the resulting mixture was poured into a separate container having 999.0 grams of deionized water under agitation from a mechanical stirrer to form an aqueous dispersion. The resulting dispersion was stirred for 1 hour. 1,003.4 grams of deionized water were then added to the dispersion with mixing.

The solids content was then determined by adding a quantity of the dispersion to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of the examples below. The resulting anionic phosphatized epoxy resinous dispersion had a solids content of 39.67%. This method was repeated in each of Examples B through E below.

The weight average molecular weight was determined by gel permeation chromatography, which was performed using a Waters 2695 separation module with a Waters 410 differential refractometer (RI detector), dimethylformamide (DMF) with 0.05 M lithium bromide (LiBr) as the eluent at a flow rate of 0.5 mL/min, and one Shodex Asahipak GF-510HQ (300×7.5 mm, 5 μm) column was used for separation. The weight average molecular weight was measured relative to linear polystyrene standards having molecular weights of 580 g/mol to 365,000 g/mol. The resulting dispersion had a weight-average molecular weight of 32,508 g/mol. This method was repeated in each of Examples B through E below.

Example B

Preparation of an Anionic Phosphatized Epoxy Resin Dispersion Prepared using 4-Dodecyl Phenol

| Charge # | Material | Amount (g) |
|---|---|---|
| 1 | Epon 880 | 579.9 |
| 2 | Bisphenol A | 159.6 |
| 3 | 4-Dodecyl phenol | 63.0 |
| 4 | Butyl cellosolve | 70.0 |
| 5 | PEG400 monolaurate | 105.0 |
| 6 | Ethyl triphenyl phosphonium bromide | 0.5 |
| 7 | PEG400 monolaurate | 70.0 |
| 8 | Phosphoric acid (85%) | 32.5 |
| 9 | Deionized water | 50.7 |
| 10 | Diisopropanolamine | 67.5 |
| 11 | CYMEL 1130 | 331.9 |
| 12 | MAZON 1651 | 108.2 |

To a 4-neck 3-liter round-bottom flask fitted with a reflux condenser and a mechanical stirrer, charges 1 through 6 were added and heated to 160° C. The mixture was allowed to exotherm (maximum of 180° C.) and was held for 1 hour at 160° C. The mixture was allowed to cool to 90° C. and charge 7 was then added quickly. At 90° C., charge 8 was added and the mixture was allowed to exotherm. The mixture was subsequently maintained at a temperature of 120° C. for 30 min and then allowed to cool to 100° C. At 100° C., charge 9 was gradually added and the temperature of about 100° C. was maintained for 2 hours. Then, the mixture was then allowed to cool to 90° C. and charge 10 was added, followed by charge 11 and charge 12. After mixing for 30 minutes, 1,474.8 grams of the resulting mixture was then poured into a separate container having 880.5 grams of deionized water under agitation from a mechanical stirrer to form an aqueous dispersion. The resulting dispersion was stirred for 1 hour. 883.2 grams of deionized water was then added to the dispersion with mixing.

The solids content was determined by the method described in Example A above. The resulting anionic phosphorylated epoxy resinous dispersion had a solids content of 39.75%.

The weight average molecular weight was determined by gel permeation chromatography by the method described in Example A above. The resulting dispersion had a weight-average molecular weight of 36,619 g/mol.

Example C

Preparation of an Anionic Phosphatized Epoxy Resin Dispersion Prepared Using Benzoic Acid

| Charge # | Material | Amount (g) |
|---|---|---|
| 1 | Epon 880 | 579.9 |
| 2 | Bisphenol A | 159.6 |
| 3 | Benzoic acid | 29.0 |
| 4 | Butyl cellosolve | 70.0 |
| 5 | PEG400 monolaurate | 105.0 |
| 6 | Ethyl triphenyl phosphonium bromide | 0.5 |
| 7 | PEG400 monolaurate | 70.0 |
| 8 | Phosphoric acid (85%) | 32.5 |
| 9 | Deionized water | 50.7 |
| 10 | Diisopropanolamine | 67.5 |
| 11 | CYMEL 1130 | 331.9 |
| 12 | MAZON 1651 | 108.2 |

To a 4-neck 3-liter round-bottom flask fitted with a reflux condenser and a mechanical stirrer, charges 1 through 6 were added and heated to 160° C. The mixture was allowed to exotherm (maximum of 180° C.) and was held for 1 hour at 160° C. The mixture was allowed to cool to 90° C. and charge 7 was then added quickly. At 90° C., charge 8 was added and the mixture was allowed to exotherm. The mixture was subsequently maintained at a temperature of 120° C. for 30 min and allowed to cool to 100° C. At 100° C., charge 9 was gradually added and a temperature of about 100° C. was maintained for 2 hours. Then, the mixture was allowed to cool to 90° C. and charge 10 was added, followed by charge 11 and charge 12. After mixing for 30 minutes, 1,444.3 grams of the resulting mixture was poured into a separate container having 855.5 grams of deionized water under agitation from a mechanical stirrer to form an aqueous dispersion. The dispersion was stirred for 1 hour. 862.4 grams of deionized water was then added to the dispersion with mixing.

The solids content was determined by the method described in Example A above. The resulting anionic phosphorylated epoxy resinous dispersion had a solids content of 39.20%.

The weight average molecular weight was determined by gel permeation chromatography by the method described in Example A above. The resulting dispersion had a weight-average molecular weight of 33,207 g/mol.

Example D

Preparation of an Anionic Phosphatized Epoxy Resin Dispersion Prepared Using Nonyl Phenol

| Charge # | Material | Amount (g) |
|---|---|---|
| 1 | Epon 880 | 579.9 |
| 2 | Bisphenol A | 159.6 |
| 3 | Nonyl phenol | 54.4 |
| 4 | Butyl cellosolve | 70.0 |
| 5 | PEG400 monolaurate | 70.0 |
| 6 | Ethyl triphenyl phosphonium bromide | 0.5 |
| 7 | Lutensol XP50[1] | 56.0 |
| 8 | Phosphoric acid (85%) | 32.5 |
| 9 | Deionized water | 50.7 |
| 10 | Diisopropanolamine | 67.5 |
| 11 | CYMEL 1130 | 331.9 |
| 12 | MAZON 1651 | 108.2 |

[1]Alkyl polyethylene glycol ethers available from BASF

To a 4-neck 3-liter round-bottom flask fitted with a reflux condenser and a mechanical stirrer, charges 1 through 6 were added and heated to 160° C. The mixture was allowed to exotherm (maximum of 180° C.) and was held for 1 hour at 160° C. The mixture was allowed to cool to 90° C. and charge 7 was then added quickly. At 90° C., charge 8 was added and the mixture was allowed to exotherm. The mixture was subsequently maintained at a temperature of 120° C. for 30 min and then allowed to cool to 100° C. At 100° C., charge 9 was gradually added and a temperature of about 100° C. was maintained for 2 hours. Then, the mixture was then allowed to cool to 90° C. and charge 10 was added, followed by charge 11 and charge 12. After mixing for 30 minutes, 1,423.0 grams of the resulting mixture was poured into a separate container having 838.1 grams of deionized water under agitation from a mechanical stirrer to form an aqueous dispersion. The dispersion was stirred for 1 hour. 847.9 grams of deionized water was then added to the dispersion with mixing.

The solids content was determined by the method described in Example A above. The resulting anionic phosphorylated epoxy resinous dispersion had a solids content of 39.57%.

The weight average molecular weight was determined by gel permeation chromatography by the method described in Example A above. The resulting dispersion had a weight-average molecular weight of 33,567 g/mol.

Comparative Example E

Preparation of an Anionic Phosphorylated Epoxy Resinous Dispersion Prepared without a Mono-Functional Alcohol or Mono-Functional Acid

| Charge # | Material | Amount (g) |
|---|---|---|
| 1 | Epon 880 | 662.7 |
| 2 | Bisphenol A | 213.2 |
| 3 | Butyl cellosolve | 80.2 |
| 4 | PEG400 monolaurate | 161.0 |
| 5 | Ethyl triphenyl phosphonium bromide | 0.6 |
| 6 | Butyl cellosolve | 65.6 |
| 7 | Phosphoric acid (85%) | 37.1 |
| 8 | Deionized water | 57.9 |
| 9 | Diisopropanolamine | 77.1 |
| 10 | CYMEL 1130 | 397.6 |
| 11 | MAZON 1651 | 123.8 |

To a 4-neck 3-liter round-bottom flask fitted with a reflux condenser and a mechanical stirrer, charges 1 through 5 were added and heated to 160° C. The mixture was allowed to exotherm (maximum of 180° C.) and was held for 1 hour at 160° C. The mixture was allowed to cool to 90° C. and charge 6 was added quickly. At 90° C., charge 7 was added and the mixture was allowed to exotherm. The mixture was subsequently maintained at a temperature of 120° C. for 30 min and then allowed to cool to 100° C. At 100° C., charge 8 was gradually added and a temperature of about 100° C. was maintained for 2 hours. The mixture was then allowed to cool to 90° C. and charge 9 was added, followed by charge 10 and charge 11. After mixing for 30 minutes, 1,673.1 grams of the resulting mixture was then poured into a separate container having 887.5 grams of deionized water under agitation from a mechanical stirrer to form an aqueous dispersion. The dispersion was stirred for 1 hour. 959.7 grams of deionized water was then added to the dispersion with mixing.

The solids content was determined by the method described in Example A above. The resulting anionic phosphorylated epoxy resinous dispersion had a solids content of 39.74%.

The weight average molecular weight was determined by gel permeation chromatography by the method described in Example A above. The resulting dispersion had a weight-average molecular weight of 52,448 g/mol.

Electrodepositable Coating Composition Examples

Example 1

Water Dispersible Acrylic Polymer (Low VOC Acrylic Grind Vehicle)

TABLE 1

| Charge # | Material | Amount (g) |
|---|---|---|
| | n-Butanol | 276.7 |
| | PEG 400 Monolaurate[1] | 1579.0 |
| | Styrene | 763.7 |
| | Methacrylic Acid | 371.5 |
| | Butyl Acrylate | 1505.8 |
| | Hydroxyethyl Acrylate | 295.1 |
| | Tertiary Dodecyl Mercaptan | 175.4 |
| | n-Butanol | 154.8 |
| | Tertiary Butyl Perbenzoate | 67.1 |
| 4 | n-Butanol | 175.5 |
| | AMPS[2] | 2.1 |
| | Diisopropanolamine | 1.4 |
| | n-Butanol | 20.6 |
| | Tertiary Butyl Perbenzoate | 3.5 |
| | n-Butanol | 9.2 |
| | Tertiary Butyl Perbenzoate | 5.3 |
| | Distillate | −605.0 |

[1]Polyethylene Glycol Monolaurate commercially available from Henkel Corp.
[2]2-Acrylamido-2-methylpropanesulfonate commercially available from Lubrizol Corp.

Charge 1 was added to the reactor and heated to reflux (about 113-116° C.) with a set point temperature of 115° C. Charges 2 and 4 were mixed together and were co-fed into the reactor with Charge 3 over 3 hours. After the additions were complete, the reaction was held for 30 minutes while heating to reflux. After 30 minutes, Charge 5 was added over 10 minutes and held another 60 minutes. Charge 6 was then added over 10 minutes and the reaction was held for another 60 minutes. The temperature of the reaction was not allowed to exceed 129° C. The reaction was then cooled to 115° C. At that temperature, increasing vacuum was slowly applied to the reactor and distillate was collected. After distillation, the reactor was allowed to cool and the mixture was poured out.

Example 2

Low VOC Black Pigment Paste (Prepared with Grind Resin in Table 1)

This example illustrates the preparation of a black pigment grind composition using the acrylic grind vehicle of table 1 above. The pigment paste was prepared from a mixture of the following ingredients:

TABLE 2

| Charge # | Material | Amount (g) |
|---|---|---|
| 1 | Anionic Acrylic Grind Resin of Table 1 | 185.2 |
| 2 | Diisopropanol Amine | 72.8 |
| 3 | Deionized Water | 605.0 |
| 4 | Clay[1] | 234.2 |
| 5 | Carbon Black[2] | 99.6 |
| 6 | Total | 1196.8 |

[1]Commercially available as ASP-170 from Engelhard
[2]Commercially available as Raven 1200 from Columbian Chemicals Company All ingredients were pre-mixed under agitation and ground for approximately 1 hour in a sand mill using zirconia ceramic beads as grind media until a 7 Hegman grind was obtained. The resultant pigment dispersion had a resin solids content of 15.47 percent and a pigment solids content of 27.89 percent, the percentages being based on the total weight of the pigment paste.

Example 3

Low VOC High Film Build Black Paint (Prepared with Low VOC Pigment Paste of Ex. 2)

This example illustrates the preparation of a low VOC, high film build anionic epoxy paint bath prepared with pigment grind composition in table 2. The paint bath was prepared from a mixture of the following ingredients:

TABLE 3

| Charge # | Material | Amount (g) |
|---|---|---|
| 1 | Anionic Resin Example A | 796.9 |
| 2 | Butyl Carbitol formal[1] | 15.0 |
| 3 | Pigment Paste[2] | 61.3 |
| 4 | DI Water | 2726.8 |

[1]Available as MAZON 1651 from BASF Corporation
[2]Pigment paste from Table 2 above Charges 1-3 were added sequentially to a one-gallon stainless-steel laboratory container at room temperature. The mixture was then mixed under agitation for 10 minutes until homogeneous. Charge 4 was added under agitation over a period of 5 minutes. The resulting anionic electrodepositable paint compositions had a solids content of 10 percent and a pigment to binder ratio of 0.05/1.0 by weight. The solids content was determined by adding a quantity of the paint composition to a tared aluminum dish, recording the weight of the dispersion and dish, heating the test specimen in the dish for 60 minutes at 110° C. in an oven, allowing the dish to cool, reweighing the dish to determine the amount of non-volatile content remaining, and determining the solids content by dividing the weight of the non-volatile content by the total sample weight and multiplying by 100. This procedure was used to determine the solids content in each of Examples 4-7 below.

Example 4

High Film Build Black Paint (Prepared with Standard Commercial Black Paste (AP287))

This example illustrates the preparation of high film build anionic epoxy paint bath prepared with pigment grind composition commercially available from PPG as AP287. This is a slightly higher VOC compared to formulation outlined in table 3. The paint bath was prepared from a mixture of the following ingredients:

TABLE 4

| Charge # | Material | Amount (g) |
|---|---|---|
| 1 | Anionic Resin Example A | 796.9 |
| 2 | Butyl Carbitol formal[1] | 15.0 |
| 3 | Pigment Paste[2] | 100.0 |
| 4 | DI Water | 2688.1 |

[1]Available as MAZON 1651 from BASF Corporation
[2]Pigment paste commercially available from PPG as AP287

Charges 1-3 were added sequentially to a one-gallon stainless-steel laboratory container at room temperature. The mixture was then mixed under agitation for 10 minutes until homogeneous. Charge 4 was added under agitation over a period of 5 minutes. The resulting anionic electrodepositable paint compositions had a solids content of 10 percent as measured by the method described previously and a pigment to binder ratio of 0.05/1.0 by weight.

Example 5

Standard Commercially Available High VOC Black Anionic Epoxy Paint

This example illustrates the preparation of a commercially available black anionic epoxy that is higher in VOC and has lower film build characteristics compared to Examples 3 and 4. The paint bath was prepared from the following ingredients:

TABLE 5

| Charge # | Material | Amount (g) |
|---|---|---|
| 1 | Anionic Resin[1] | 728.5 |
| 2 | Pigment Paste[2] | 98.5 |
| 3 | DI Water | 2793 |

[1]Commercially available as AR150 from PPG
[2]Commercially available as AP287 from PPG Charges 1-2 were added sequentially to a one-gallon stainless-steel laboratory container at room temperature. The mixture was then mixed under agitation for 10 minutes until homogeneous. Charge 3 was added under agitation over a period of 5 minutes. The resulting anionic electrodepositable paint composition had a solids content of 10 percent as measured by the method described previously and a pigment to binder ratio of 0.05/1.0 by weight.

Example 6

Standard Commercially Available High VOC Black Anionic Epoxy Paint

This example illustrates the preparation of a commercially available black anionic epoxy that is higher in VOC and has lower film build characteristics compared Examples 3 and 4. The paint bath was prepared from the following ingredients:

TABLE 6

| # | Material | Amount (g) |
|---|---|---|
| 1 | Anionic Resin[1] | 491.3 |
| 2 | Pigment Paste[2] | 98.1 |
| 3 | DI Water | 3010.6 |

[1]Commercially available as AR150H from PPG
[2]Commercially available as AP287 from PPG Charges 1-2 were added sequentially to a one-gallon stainless-steel laboratory container at room temperature. The mixture was then mixed under agitation for 10 minutes until homogeneous. Charge 3 was added under agitation over a period of 5 minutes. The resulting anionic electrodepositable paint composition had a solids content of 10 percent as measured by the method described previously and a pigment to binder ratio of 0.05/1.0 by weight.

Example 7

Standard Commercially Available Black Cationic Epoxy

The following example illustrates the preparation of a black cationic epoxy paint bath. The bath was prepared from the following ingredients.

TABLE 7

| # | Material | Amount (g) |
|---|---|---|
| 1 | Cationic Epoxy Resin[1] | 1868.6 |
| 2 | Pigment Paste[2] | 273.9 |
| 3 | DI Water | 1857.4 |

[1]Commercially available as CR681 from PPG
[2]Commercially available as CP524 from PPG Charges 1-2 were added sequentially to a one-gallon stainless-steel laboratory container at room temperature. The mixture was then mixed under agitation for 10 minutes until homogeneous. Charge 3 was added under agitation over a period of 5 minutes. The resulting cationic epoxy electrodepositable paint composition had a solids content of 20 percent as measured by the method described previously and a pigment to binder ratio of 0.10/1.0 by weight.

Coated panels were prepared from baths separately containing the anionic and cationic electrodepositable paint compositions and were evaluated for film build capabilities, corrosion resistance, UV durability, and Chemical resistance. The results are reported below.

Evaluation of Paint Examples

Calculated VOC

The VOC was calculated for each of the paint examples described above according to the following formula:

$$VOC\ (lb/gallon) = \frac{\text{weight of } VOC \text{ solvent (lb)}}{\text{volume of total resin dispersion (gal)} - \text{volume of water(gal)}}$$

The results are provided below in Table 8.

TABLE 8

| | Calculated VOC of Paint Examples | | | |
|---|---|---|---|---|
| Description | Blend Ratio Resin:Paste (v:v) | VOC of resin (lb/gal) | VOC of paste (lb/gal) | Total VOC of blended paint (lb/gal) |
| Example 3 | 9:1 | 0.49 | 0.09 | 0.43 |
| Example 4 | 8:1 | 0.49 | 0.54 | 0.48 |
| Example 5 | 9:1 | 1.43 | 0.54 | 1.34 |
| Example 6 | 5:1 | 2.46 | 0.54 | 2.28 |
| Example 7 | 7:1 | 0.31 | 2.25 | 0.62 |

Film Thickness Capability Evaluation

The above described electrodepositable paint composition of Example 3, Example 4, Example 5 and Example 6 were electrodeposited onto cold rolled steel test panels, 4×6× 0.026 inches, pretreated with Bonderite® 952 ("B952") zinc phosphate and Parcolene® 90 ("P90") non-chrome sealer. These panels are available from ACT Laboratories of Hillside, Mich. Electrodeposition of the coating composition onto the panels was conducted by immersing a panel into a stirring bath containing one of the electrodepositable paint compositions of Examples 3, 4, 5 or 6 heated to a temperature of 35° C., connecting the anode of a direct current rectifier to the panel and connecting the rectifier's cathode to a stainless-steel coating beaker, and applying an electrical potential between the electrodes to deposit the paint composition on the panel. Individual panels were coated at a constant voltage for 120 seconds. After electrodeposition, the panels were removed from the bath and rinsed vigorously with a spray of deionized water. The panels were then baked in a gas fired oven at 121° C. for 25 minutes to cure the deposited coating. The dry film thickness of each coated panel was measured and is reported below in Tables 9-12 below.

The above described electrodepositable paint composition of Example 7 was electrodeposited on cold rolled steel test panels having the same specifications as described above. Electrodeposition of the coating composition onto the panels was conducted by immersing a panel into a stirring bath containing the electrodepositable paint composition heated to a temperature of 32° C., connecting the cathode of a direct current rectifier to the panel and connecting the rectifier's anode to a stainless-steel coating beaker, and applying an electrical potential between the electrodes to deposit the paint composition on the panel. Individual panels were coated at a constant voltage for 120 seconds. After electrodeposition, the panels were removed from the bath and rinsed vigorously with a spray of deionized water. The panels were then baked in a gas fired oven at 176° C. for 25 minutes. The dry film thickness of each coated panel was measured and is reported in Table 13 below.

TABLE 9

| Paint Composition from Example 3 | | | | | |
|---|---|---|---|---|---|
| Voltage | 110 V | 120 V | 130 V | 140 V | 150 V |
| Dry Film Thickness | 1.6 mils | 2.0 mils | 2.3 mils | 2.8 mils | 3.5 mils |

TABLE 10

| Paint Composition from Example 4 | | | | | |
|---|---|---|---|---|---|
| Voltage | 110 V | 120 V | 130 V | 140 V | 150 V |
| Dry Film Thickness | 1.9 mils | 2.1 mils | 2.5 mils | 2.75 mils | 3.4 mils |

TABLE 11

| Paint Composition from Example 5 | | | | | |
|---|---|---|---|---|---|
| Voltage | 100 V | 125 V | 150 V | 175 V | 200 V |
| Dry Film Thickness | 0.45 mils | 0.55 mils | 0.66 mils | 0.81 mils | 1.0 mils |

TABLE 12

| Paint Composition from Example 6 | | | | | |
|---|---|---|---|---|---|
| Voltage | 75 V | 100 V | 125 V | 150 V | 160 V |
| Dry Film Thickness | 0.57 mils | 0.93 mils | 1.32 mils | 1.55 mils | 1.65 mils |

TABLE 13

Paint Composition from Example 7

| Voltage | 150 V | 200 V | 225 V | 250 V | 275 V |
|---|---|---|---|---|---|
| Dry Film Thickness | 0.66 mils | 0.93 mils | 1.03 mils | 1.08 mils | 1.15 mils |

Exterior UV Durability Testing in South Florida—3 Month Exposure

The following example illustrates the exterior durability of a standard cationic epoxy black electrodeposition paint formulation found in Example 7 compared to the anionic low VOC, high film build anionic epoxy found in Example 4 and the standard anionic epoxy of Examples 5 and 6.

Each coating composition was electrodeposited onto cold rolled steel test panels, 4×6×0.026 inches, pretreated with Bonderite® 952 ("B952") zinc phosphate and Parcolene® 90 ("P90") non-chrome sealer (available from ACT Laboratories of Hillside, Mich.), at the voltage provided in Table 14 below, and the coated panels were baked in a gas-fired oven according to the bake temperature and bake time also provided in Table 14 below. The dry film thickness of the resultant cured coating is provided in Table 14. The gloss retention was measured according to the UV Durability Test as follows: An initial 60° gloss of each cured panel was measured using a BYK-Gardner gloss meter, and the panels were then exposed to the sun in Florida (Fort Lauderdale) at a 45° angle from horizontal facing south for 3 months. Following the exposure, the 60° gloss of each panel was measured in the same way. The gloss retention was calculated by dividing the 60° gloss value after exposure by the initial 60° gloss value and multiplying by 100%. The initial 60° gloss, the 60° gloss after 3 months exposure, and the gloss retention provided as a percentage is included in Table 14 below. These results indicate a high gloss retention compared to both the cationic epoxy and standard anionic epoxy coating compositions. This was a surprising and unexpected result.

TABLE 14

| Paint Formula | Bake Temp/ Bake Time/ Voltage | Dry Film Thickness | Initial 60 Degree Gloss | 60 Degree Gloss at 3 months Exposure | % Gloss Retention |
|---|---|---|---|---|---|
| Example 4 (Low VOC High Film Build Anionic Epoxy) | 250 F./ 20 min/ 100 V | 1.5 mils | 66 | 67 | 102 |
| Example 5 (AR150 Commercially Available anionic epoxy) | 250 F./ 20 min/ 175 V | 0.85 mils | 36 | 13 | 28 |
| Example 6 (AR150H Commercially Available anionic epoxy) | 250 F./ 20 min/ 100 V | 1.0 mils | 36 | 17 | 47 |
| Example 7 (Framecoat II Cationic Epoxy) | 350 F./ 20 min/ 200 V | 0.82 mils | 79 | 23 | 29 |

Corrosion Resistance Evaluation

The following table illustrates the corrosion resistance of the example paint formulations. Panels were tested according to ASTM B117 salt fog specifications. The results show that the experimental paint of Example 4 performed as well or better than the standard anionic epoxy paints of Examples 5 and 6, and comparatively to the cationic epoxy of Example 7.

TABLE 15

| Test Method | Pretreat | Film Build | Example 4 (baked at 300° F./ 30') | Example 5 (baked at 300° F. for 30') | Example 6 (baked at 300° F. for 20') | Example 7 (baked at 350° F./ 20') |
|---|---|---|---|---|---|---|
| ASTM B117 240 Hours | B952-P90 | 0.9 mils | 1.3 mm total creep | 1.3 mm total creep | 1.3 mm total creep | 0.0 mm total creep |
| ASTM B117 336 Hours | B952-P90 | 0.9 mils | 1.4 mm total creep | 1.6 mm total creep | 1.6 mm total creep | 0.5 mm total creep |
| ASTM B117 500 Hours | B952-P90 | 0.9 mils | 2.0 mm total creep | 2.1 mm total creep | 2.5 mm total creep | 1.1 mm total creep |

Effect of Higher Film Thickness on Corrosion Resistance of Rough Cast Metal Panels The above described electrodepositable paint composition of Example 4, was electrodeposited onto heavy cast cold rolled steel test panels with a rough surface profile, pretreated with Bonderite® 958 ("B958") tri-cation phosphate. These panels are available from ACT Laboratories of Hillside, Mich. Electrodeposition of the coating composition onto the panels was conducted by immersing a panel into a stirring bath containing paint composition of Example 4. The bath was heated to a temperature of 32° C. with the anode of a direct current rectifier connected to the panel and the rectifier's cathode connected to a stainless-steel coating beaker. An electrical potential was applied between the electrodes to deposit the paint composition on the panel. Individual panels were coated at various voltages and various deposition times to produce dry film thicknesses that ranged from 1 mil up to 4 mils. After electrodeposition, the panels were removed from the bath and rinsed vigorously with a spray of deionized water. The panels were then baked in a gas fired oven at 121° C. for 25 minutes to cure the deposited coating. The electrodeposition coating conditions and dry film thickness of each coated panel (labeled A-D) was measured and is reported in Table 16 below. The coated panels were exposed to 360 hours of salt spray according to ASTM B117 and measured for the percentage (%) of rust area on the surface of the coated panel.

The rust area was measured according to the following procedure: In a room with ambient fluorescent lighting, a Basler ace acA4600-10uc Color USB 3.0 Camera equipped with an 8 mm MegaPixel Fixed Focal Length Lens was mounted to a copy stand having a 9"×12" base with the lens facing the base of the stand. The copy stand was positioned so that the lens was 8" from the base of the stand. The base was covered with a sheet of 8.5"×11" white printer paper. Pylon 5 Camera Software Suite for Windows was used to run an automatic image adjustment. Each panel was positioned on the paper such that the panel is completely within the camera's view as shown on the Pylon Viewer. The lens aperture was adjusted so that the f number was equal to 2.8 and the picture was mildly over exposed, and the aperture ring was locked. The focus was adjusted so that the panel was in focus, and the lens focus ring was locked. A picture was taken and saved using the Pylon Viewer. The saved image was analyzed using the 32 bit Microsoft Windows version of FIJI software (ImageJ 1.51d). Using the physical width measurement of the panel, the set scale function was used to convert image dimensions from pixels to inches (2370 Pixels=4 Inches), and the setting was globalized. The rectangle tool was used to select a 2.01"×2.01" square 0.2" from the right edge of the panel and 1.2" from the top of the panel. The Duplicate function was used on the rectangular selection. The Brightness/Contrast Window was opened and auto was selected. The Despeckle function was used. The color threshold window was opened and thresholding method Yen was selected, the Hue parameters were set to 44 and 224, the Pass box was deselected so that it was not checked, and the select button in the Color Threshold window was clicked. The measure function was used and the measured area recorded. The measured area is the measured area of rust, and the measured area was converted to a percentage of the 2.01"×2.01" square patch. These steps were repeated with a 2.01"×2.01" square 0.2" from the right edge of the panel and 2.3" from the top of the panel, and the two percentage values were averaged to obtain the % rust area result for each panel.

TABLE 16

| Example | A | B | C | D |
|---|---|---|---|---|
| Bath Temp (° C.) | 32 | 32 | 32 | 32 |
| Voltage | 160 | 190 | 190 | 200 |
| Time (seconds) | 120 | 130 | 180 | 180 |
| Amp Limit | 1 | 1.1 | 1.1 | 1.1 |
| Ramp (s) | 45 | 30 | 30 | 30 |
| Coulombs | 101 | 133 | 152 | 175 |
| DFT (mils (microns)) | 1.00 (25.40) | 2.00 (50.80) | 3.00 (76.20) | 3.75 (95.25) |
| Rust (% area) | 76.93 | 52.40 | 9.96 | 5.00 |

The results provided in Table 16 show that increasing the dry film thickness of the coating results in a decreasing amount of rust area. The thickness of coating A through D increases, and the rust area correspondingly decreases.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising a main vehicle comprising:
   a phosphatized epoxy resin, wherein the phosphatized epoxy resin comprises a reaction product of reactants comprising:
      an epoxy-functional polymerization product comprising the residue of:
         a polyepoxide;
         a polyphenol; and
         a mono-functional acid and/or a mono-functional alcohol, wherein the ratio of epoxide functional groups from the polyepoxide to hydroxyl groups from the mono functional alcohol and/or acid groups from the mono-functional acid is from 8.1:1 to 19:1; and
      a source of phosphoric acid, a source of phosphonic acid, or combinations thereof;
   a plasticizer; and
   a curing agent;
   wherein the main vehicle comprises no more than 1.00 lb/gallon of volatile organic content.

2. The electrodepositable coating composition of claim 1, wherein the reaction for forming the reaction product is performed in a solvent system comprising the plasticizer, and the solvent system comprises no more than 50% by weight of volatile organic solvent, based on the total weight of the solvent system.

3. The electrodepositable coating composition of claim 2, wherein the phosphatized epoxy resin further comprises a reaction residue of the plasticizer.

4. The electrodepositable coating composition of claim 3, wherein the plasticizer has a number average molecular weight of at least 200 g/mol.

5. The electrodepositable coating composition of claim 1, wherein the mono-functional acid comprises benzoic acid.

6. The electrodepositable coating composition of claim 1, wherein the mono-functional alcohol comprises a phenol.

7. The electrodepositable coating composition of claim 6, wherein the phenol comprises nonyl phenol, dodecyl phenol or combinations thereof.

8. The electrodepositable coating composition of claim 1, wherein the phosphatized epoxy resin has a molecular weight of 22,000 g/mol to 40,000 g/mol, as measured by gel permeation chromatography using polystyrene standards.

9. The electrodepositable coating composition of claim 1, wherein the plasticizer comprises a polyethylene glycol ester and/or a polypropylene glycol ester.

10. The electrodepositable coating composition of claim 9, wherein the polyethylene glycol ester comprises polyethylene glycol monolaurate.

11. The electrodepositable coating composition of claim 9, wherein the polyethylene glycol ester has a molecular weight of 200 g/mol to 1,500 g/mol, as measured by gel permeation chromatography using polystyrene standards.

12. The electrodepositable coating composition of claim 1, wherein the plasticizer has a boiling point of greater than 250° C.

13. The electrodepositable coating composition of claim 1, wherein the ratio of phosphatized epoxy resin solids to volatile organic content is 7:1 to 25:1.

14. The electrodepositable coating composition of claim 1, wherein the coating composition comprises 10% to 40% by weight of the plasticizer, based on the total weight of the resin solids.

15. The electrodepositable coating composition of claim 1, wherein a coating applied by electrodepositing the coating composition has a dry film thickness of at least 38.1 microns.

16. The electrodepositable coating composition of claim 1 further comprising a pigment paste.

17. The electrodepositable coating composition of claim 1, wherein a coating applied by electrodepositing the coating composition has dry film-thickness of at least 50 microns.

18. The electrodepositable coating composition of claim 1, wherein a coating applied by electrodepositing the coating composition has a gloss retention of at least 60% after 3 months UV exposure as measured according to the UV Durability Test.

19. A coating formed by at least partially curing the electrodepositable coating composition of claim 1.

20. A substrate coated with the electrodepositable coating composition of claim 1 in an at least partially cured state.

21. The substrate of claim 20, wherein the electrodepositable coating layer has a dry film-thickness of at least 50 microns.

22. The electrodepositable coating composition of claim 1, wherein the electrodepositable coating composition is an anionic electrodepositable coating composition.

* * * * *